United States Patent
Holm-Öste et al.

(10) Patent No.: US 8,488,460 B2
(45) Date of Patent: Jul. 16, 2013

(54) METHOD AND APPARATUS FOR EVALUATING SERVICES IN COMMUNICATION NETWORKS

(75) Inventors: Gerd Holm-Öste, Danderyd (SE); Matz Norling, Märsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 327 days.

(21) Appl. No.: 12/593,914

(22) PCT Filed: Mar. 28, 2008

(86) PCT No.: PCT/SE2008/050353
§ 371 (c)(1),
(2), (4) Date: Mar. 3, 2010

(87) PCT Pub. No.: WO2008/121062
PCT Pub. Date: Oct. 9, 2008

(65) Prior Publication Data
US 2010/0195496 A1    Aug. 5, 2010

(30) Foreign Application Priority Data
Mar. 29, 2007 (SE) .................. 0700796

(51) Int. Cl.
*G01R 31/08* (2006.01)

(52) U.S. Cl.
USPC .......................... 370/232; 370/252

(58) Field of Classification Search
None
See application file for complete search history.

(56) References Cited

U.S. PATENT DOCUMENTS
7,295,549 B2 * 11/2007 Pepin et al. ............ 370/352
2005/0097209 A1    5/2005 McDonagh

FOREIGN PATENT DOCUMENTS
WO    WO 2005032186 A1    4/2005

* cited by examiner

Primary Examiner — David Oveissi

(57) ABSTRACT

A method and apparatus (400) for evaluating the performance of a user service executed in a communication network by means of one or more user-independent system services. A measuring block (400a) measures a set of system service key performance indicators S-KPIs for each system service, the S-KPIs being carefully selected to reflect the performance of the system services from a user perspective. Relevant data for measuring the S-KPIs is collected from sensors and counters, including infrastructure data (402c), traffic data (402b) and end user data (402a). A service evaluating block (400b) then evaluates or estimates the performance of the user service based on the measured S-KPIs. By making a distinction between system services and user services in this way and using measurable S-KPIs, more consistent and reliable service evaluations can be obtained.

11 Claims, 3 Drawing Sheets

500 S-KPI Index, SPI

| | A | B | C | D | E | F |
|---|---|---|---|---|---|---|
| | S-KPI *name* | Measured value | Theoretical value in def. environment | Acceptance value | Threshold in real network | Allowed delta. (+/-agreed value) |
| 1 | | | | | | |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |

Fig. 5

METHOD AND APPARATUS FOR EVALUATING SERVICES IN COMMUNICATION NETWORKS

TECHNICAL FIELD

The present invention relates generally to a method and arrangement for enabling consistent and reliable evaluation of quality for services executed in communication networks.

BACKGROUND

With the emergence of 3 G mobile telephony, new packet-based communication technologies using IP (Internet Protocol) have been developed to support communication involving multimedia services. Furthermore, numerous different mobile and fixed terminals capable of multimedia communication are available on the market. At the same time, a multitude of new services involving communication of various types of media are also constantly being developed to increase the field of usage for various communication terminals. The capacity and capabilities in access and service networks are also ever improved to cater for increased traffic and delivery of more services. For example, one major evolution step for enabling multimedia services has been the introduction of IMS (IP Multimedia Subsystem) which is basically a platform for handling and controlling multimedia sessions.

At present, there is no efficient and consistent way to monitor and assess service quality unambiguously in communication networks. Thus, there is no unified way of monitoring and ensuring that a consumed service actually meets the consumer/user expectations, regardless of what has been guaranteed to the operator. Furthermore, it is also difficult to control whether so-called "Service Level Agreements" (SLAs) are met properly, which can be established between end-users and the networks or between service providers and the networks. For example, if a customer complains that an expected service quality has not been fulfilled during a communication session, the network operator has no means to check the relevance thereof.

In order to evaluate the performance of services in communication networks, one or more known performance indicators can be monitored, often referred to as "Key Performance Indicators", KPIs. A KPI generally indicates the performance in the network with respect to a predefined factor or parameter more or less relevant for the performance of executed services, service assurance and evaluated SLAs. This factor or parameter can be detected or measured by means of one or more sensors, probes and/or counters in the network to determine an associated current KPI value or level, which typically fluctuates over time.

The KPI values may be derived from information in a session database maintained in a mobile network, but also from other information sources. For example, a predefined KPI may relate to bandwidth occupation, latency, packet loss rate, available bitrate, or network and service accessibility, etc. Thus, a multitude of KPI's related to different aspects of network functions are currently known and can be monitored, using various sensors and counters, in order to evaluate the network and/or service performance.

For example, different network elements in an operator's communication network of today can produce anything from 40 up to 4000 different raw counters or sensors that somehow describe the behaviour of the network. Moreover, in view of the future architecture evolution that can be foreseen today, the number of available counters and sensors in network elements will most likely increase rapidly.

Today, there are a variety of service performance indicators or KPIs in use for performance evaluation, at least in the field of telecommunication. Given the great number of available counters and sensors, the number of available and predefined KPIs will also surely increase rapidly in the future.

However, the immense number of available KPIs presents a great challenge in meeting requirements for user service performance, service assurance and SLAs. Due to the great number of different user services available today, the process of monitoring the performance of all these services can be quite complex. What is more, vendors, operators and service providers rarely choose the same KPIs when evaluating their networks or services, which makes comparisons and reliable assessment the more difficult. For example, the network and its elements might perform well, while the user/consumer experience of a consumed service is still not satisfactory.

As telecommunication services are becoming a significant part of our daily lives, it is important that these services perform to expectations. To achieve and guarantee excellent or at least acceptable service performance can thus be very difficult for network operators using existing quality definitions. So far, network operators have been concerned mainly with the performance of network entities, rather than the performance of the user service itself. "Quality of Service" (QoS) is a technical concept that is often used when evaluating the network and elements therein. However, QoS measurements are typically not suitable to use as a basis for discussing user service performance, since QoS merely provides a description of system capabilities.

In this context, it would be more interesting to gain knowledge of the more user-oriented aspect known as "Quality of Experience" (QoE) which can be very difficult, given the various factors that affect the user's perception of service quality. Among other things, QoE is dependent on purely technical factors such as network coverage and capacity, but also on service offers, support levels, and further subjective factors such as prices and fees. Many of these factors are controlled solely by the network operator or service provider. It is thus highly desirable to provide a consistent and reliable mechanism for enabling evaluation and assessment of user services from a user perspective, i.e. related to QoE.

US 2005/0097209 A1 discloses a solution for measuring "subscriber experience" in a telecommunications network. A management system monitors activity at various interfaces in the communication chain to gather transaction data and to filter this data to provide subscriber-centric QoS metrics in real time. Different probes are used to collect the data from taps at the interfaces and deliver filtered data to a server which determines various KPIs of interest from the delivered data.

WO 2005/032186 A1 discloses how a set of KPIs can be calculated from selected transactions in a traffic database, to characterise the performance of cells in a mobile network in terms of user perceived quality of service parameters.

US 2005/0097209 A1 and WO 2005/032186 A1 represent currently known solutions which focus on determining various KPIs which are generally used to evaluate system-related services in communication networks. However, these solutions are not capable of providing evaluation or assessment of user services that is consistent enough and thereby reliable.

SUMMARY

It is an object of the present invention to address at least some of the problems outlined above. Further, it is an object to provide a solution that enables consistent and reliable evaluation and assessment of user services executed in communication networks. These objects and others may be obtained by a method and apparatus according to the independent claims attached below. According to one aspect, a method is provided for evaluating or estimating the performance of a specific user service executed in a communication network. The user service is executed by means of one or more user-independent system services. A limited set of system service key performance indicators S-KPIs are measured for each system service, the S-KPIs being selected and established to reflect the performance of the respective system services in a relevant manner from a user perspective. Relevant data for measuring the S-KPIs is collected from sensors and counters from the following sources: a) infrastructure data, providing information on how the involved nodes handle the delivery of services, b) traffic data, containing information for each communication session when executing the user service for each user, as measured by at least one passive probe, and c) end user data, indicating how the user will experience the user service, as measured by at least one active probe. The performance of the user service is then evaluated or estimated based on the measured S-KPIs.

The S-KPIs may include a maximum of 10 selected S-KPIs for each system service. In one possible embodiment, the S-KPIs are selected and established to reflect at least one of the following areas: the rate of setting up the user service successfully, the rate of keeping the user service up and running successfully, and the rate of achieving a good or at least acceptable quality successfully for the user service.

The S-KPIs can be measured by aggregating data collected from sensors and counters installed in the communication path, when the respective system services are executed. The S-KPIs can further be measured and monitored on a continuous basis. The measured S-KPIs may be provided for each system service in a Service Performance Index SPI containing current values of the S-KPIs.

According to another aspect, an apparatus is provided for evaluating or estimating the performance of a specific user service executed in a communication network, the user service being executed by means of one or more user-independent system services. The apparatus comprises an S-KPI measuring block adapted to measure a limited set of system service key performance indicators S-KPIs for each system service, the S-KPIs being selected and established to reflect the performance of the respective system services in a relevant manner from a user perspective. The S-KPI measuring block is further adapted to collect relevant data from sensors and counters for measuring said S-KPIs from the above-mentioned sources of infrastructure data, traffic data and end user data. The apparatus also comprises a service evaluating block adapted to evaluate or estimate the performance of the user service based on the measured S-KPIs.

In different embodiments of the apparatus, the S-KPI measuring block is further adapted to measure the S-KPIs by aggregating data collected from sensors and counters installed in the communication path when the respective system services are executed, and to measure the S-KPIs on a continuous basis. The S-KPI measuring block could be further adapted to provide the measured S-KPIs for each system service in a Service Performance Index SPI containing current values of the S-KPIs. The apparatus may also serve as a system service assurance architecture for performance monitoring.

Further possible features and benefits of the present invention will be explained in the detailed description below.

BRIEF DESCRIPTION OF THE DRAWINGS

The invention will now be explained in more detail by means of exemplary embodiments and with reference to the accompanying drawings, in which:

FIG. 5 is an exemplary Service Performance Index SPI that can be used for monitoring S-KPIs, in accordance with yet another embodiment.

DETAILED DESCRIPTION

This solution can provide improved evaluation of services executed in communication networks, by making a distinction between user services and system services. Basically, a system service is technically provided by the equipment and protocols used in the network and/or user terminal, whereas a user service relates to the actual content or result delivered to and perceived by the user. Thus, the system services are well-defined and user-independent and can be considered as the building blocks for numerous user services which may be predefined or created dynamically as required.

Figure 1:
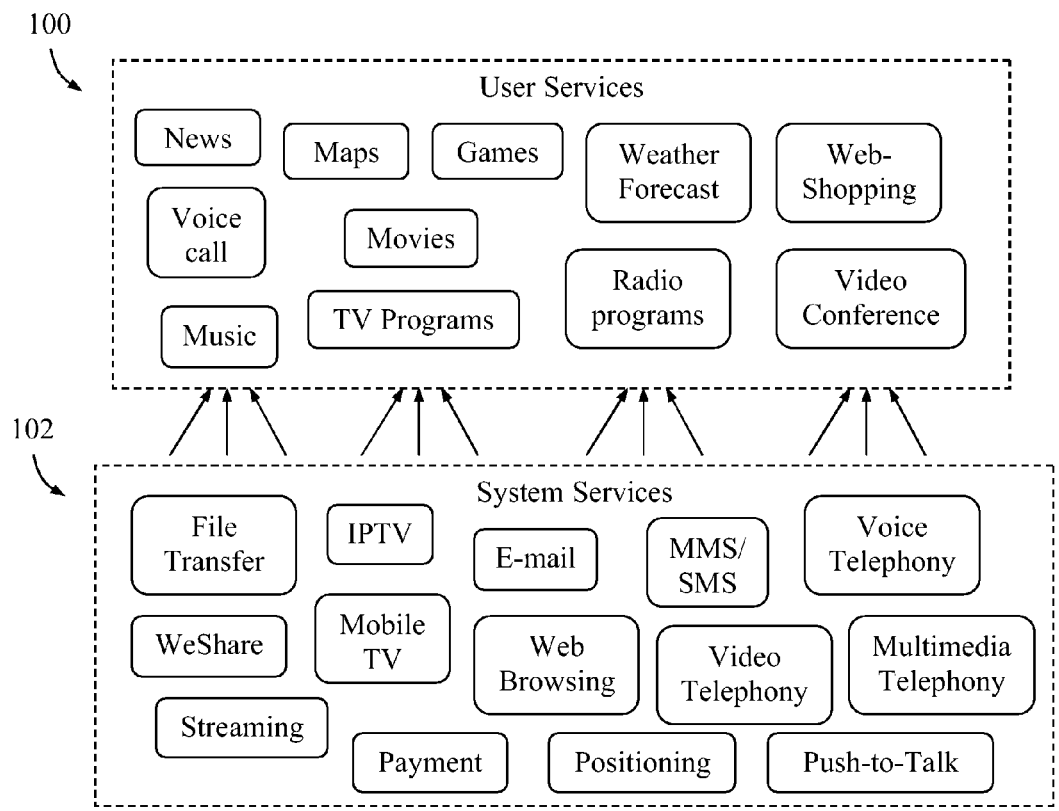
FIG. 1 is a schematic diagram illustrating the distinction between user services and system services.

FIG. 1 illustrates schematically the distinction between user services and system services by way of a few examples. Thus, the shown exemplary user services 100 include delivery of news (e.g. CNN and BBC), music, movies, TV and radio programs, maps and weather forecasts. The user services 100 further include the execution of voice calls, video conferences, on-line games and web shopping. Each of these user services 100 technically requires one or more specific system services 102, as indicated by the arrows, when executed and delivered to users.

The shown exemplary system services 102 include the necessary mechanisms for file transfer, IPTV, e-mail, MMS/SMS, traditional voice telephony, "WeShare", mobile TV, web browsing, video and multimedia telephony, streaming, electronic payment, positioning and "Push-to-Talk". The system services typically arise from a combination of access, core, and service domain infrastructure and the used terminal equipment.

Briefly described, a particular user service can be evaluated by measuring and monitoring a limited set of carefully selected KPIs which reflect the performance of one or more required system services which the user service is dependent on. These system service related KPIs are well-defined and technically measurable. For example, the user service of delivering a particular TV program to a certain user may require the system services of web browsing and IPTV or Mobile TV.

For each system service, a few significant KPIs are selected and established that reflect the service performance in a manner relevant to the users. These carefully selected KPIs are complete, comparable and similar in their implementation. To distinguish them from other KPIs, they are called "System Service KPIs" S-KPIs in this description.

Understanding the complexity of user service performance requires a detailed knowledge of the performance of required system services, although no specific selected measuring points exist today that are suitable or defined for user services or system services. It has been recognised that the demands in the telecommunication market for high service performance call for a level of quality measurement somewhere "between" QoS and QoE. This solution allows for defining, describing and formalising a new measurable quality level: the "Quality of System Service" QoSS, paving the way also for "Quality of User Service" QoUS.

Setting the quality level for system services by means of specified measuring parameters, i.e. the S-KPIs, provides a firm new level from which also the performance of user services can be measured and evaluated. Being a measurable and comparable system service level, the QoSS level can be set and determined in a consistent manner based on the S-KPI measurements, thereby offering a cost-efficient simplification and a pragmatic level that can be used also for estimating the QoUS level.

The S-KPIs are measured by aggregating data collected from sensors and counters installed in the communication path when executing the respective system services. In an exemplary service model, three different sources can be used for collecting relevant data when measuring the S-KPIs, as follows:
 a) Infrastructure data, providing information on how the involved nodes handle the delivery of services, such as alarms and performance data from networks and nodes in the communication path.
 b) Traffic data, containing information for each communication session for each user, i.e. information from ongoing commercial traffic, which can be measured by one or more passive probes, CDR (Charging Data Record) information, or the like.
 c) End user data, indicating how the user will experience the service, i.e. the user-perceived performance, which can be measured by one or more active probes or passive probes in the user equipment.

By collecting data from these three sources, a complete and reliable evaluation of the service performance can be obtained, although the present invention does not exclude the use of other sources as well for collecting relevant data.

As mentioned above, data for measuring the S-KPIs can be collected from various sensors and counters throughout the entire system, including the terminal used, such as information available from alarms, event logs, traffic and transaction records, etc. The S-KPIs can be distributed or divided into different basic types of S-KPIs according to the following areas:
 a) The rate of setting up the service successfully, referred to as "accessibility S-KPIs".
 b) The rate of keeping the service up and running successfully, referred to as "retainability S-KPIs".
 c) The rate of achieving a good or at least acceptable quality successfully, referred to as "integrity S-KPIs".

By way of example, the following S-KPIs may be selected for the system service IPTV: system start-up time (i.e. the time from power-on until TV channels are available), channel change speed (i.e. the time from pushing a remote control button until a stable TV channel is displayed), video/audio delay difference (i.e. the time difference between playback of video and audio), and so forth. In general, an S-KPI can be measured by detecting predetermined trigger points in a data/message flow at suitable locations depending on the S-KPI definitions, by means of the above-mentioned sensors/counters.

Figure 2:
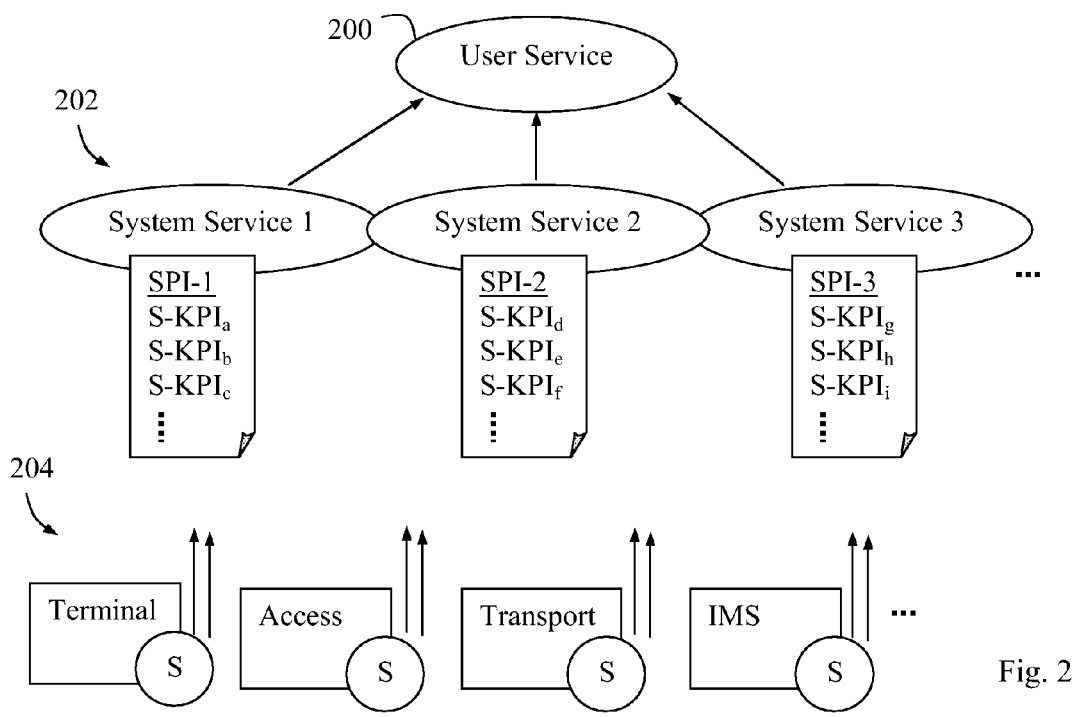
FIG. 2 is a schematic diagram illustrating how a user service can be evaluated, in accordance with one embodiment.

With reference to FIG. 2, a procedure and arrangement for how a user service 200 can be evaluated according to one embodiment will now be described. In this example, the execution of user service 200 is dependent on and requires the execution of a plurality of system services 202. For each system service 202, a limited set of well-defined and measurable S-KPIs have been selected, where each S-KPI is measured by aggregating data collected from sensors and counters, schematically denoted "S" in the figure.

As shown in the figure, the sensors/counters S may be installed at various points in the communication path used when executing the respective system service, such as in a terminal, an access network, a transport network and an IMS network, etc, depending on the current traffic case. An S-KPI may be determined from sensors and counters S in one or more of these points in the communication path depending on how that S-KPI is defined, and the present invention is not limited in this respect. The measured S-KPIs can be documented for each system service in a Service Performance Index, SPI.

In this example, the performance of a first system service 1 is documented in SPI-1 containing measuring results for a set of S-KPIs selected for system service 1: $S\text{-}KPI_a$, $S\text{-}KPI_b$, $S\text{-}KPI_c$, . . . . Likewise, the performance of a second system service 2 is documented in SPI-2 containing measuring results for a set of S-KPIs selected for system service 2: $S\text{-}KPI_x$, $S\text{-}KPI_y$, $S\text{-}KPI_z$, . . . , and the performance of a third system service 3 is documented in SPI-3 containing measuring results for a set of S-KPIs selected for system service 3: $S\text{-}KPI_h$, $S\text{-}KPI_i$, $S\text{-}KPI_j$, . . . , and so forth. It should be noted that one particular S-KPI may be relevant for more than one system service, such that the same S-KPI may occur in plural different SPIs.

The performance of user service 200 can then be evaluated in a consistent and reliable manner based on the S-KPI measurement results specified in SPI-1, SPI-2, SPI-3, . . . . It should be noted that the measurement results in the different SPIs can also be easily used for evaluating any other user services requiring any of these system services 1, 2, 3, . . . , after the required system services have been identified. As data can be constantly collected from the sensors S, the SPIs can be maintained dynamically by updating the current S-KPI values therein, such that any user services requiring any of these system services can be monitored on a continuous basis. This solution could also enable the tracing of particular important S-KPIs via currently prevailing SLAs to infrastructure, traffic and end-user data, and vice versa.

The monitoring of S-KPI measurements and evaluation of user services according to the above can be made in a service monitoring centre or the like. In one possible implementation, each S-KPI value in an SPI can be displayed by a meter or the like pointing at a green field when the S-KPI value is deemed acceptable, pointing at a red field when the S-KPI value is deemed not acceptable, and pointing at a yellow field there between as a warning that the S-KPI value is close to become not acceptable. Thereby, operators and/or service providers can easily supervise the execution of any user services.

Figure 3:
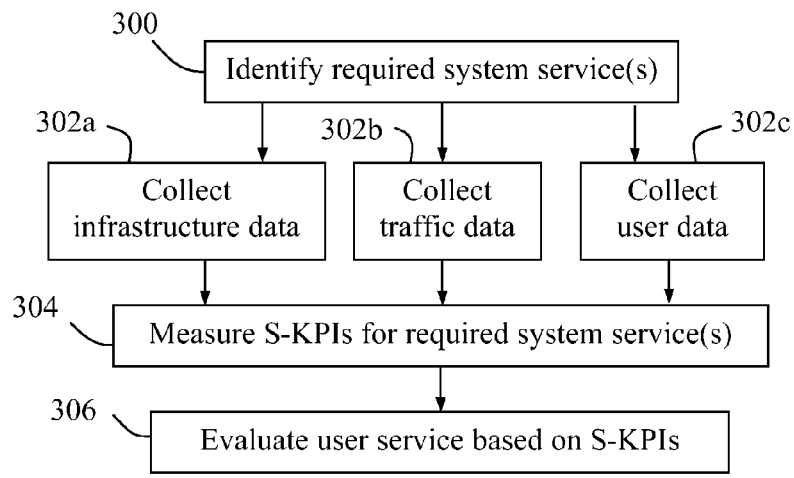
FIG. 3 is a flow chart illustrating a procedure for evaluating a user service, in accordance with another embodiment.

An exemplary procedure for evaluating a user service in a service monitoring centre or the like, will now be described with reference to the flow chart of FIG. 3. In a first step 300, one or more system services required for executing the user service are identified. This step can be considered as a configuring step for setting up the evaluation procedure. Then, data is collected from various sensors and counters in the network(s) involved and/or terminal used, which is illustrated as three parallel sub-steps 302*a-c* including collecting infrastructure data in sub-step 302*a*, collecting traffic data in sub-step 302*b*, and collecting end user data in sub-step 302*c*. These different types of data were also described above as the three data sources a), b) and c).

In a next step 304, a limited set of S-KPIs are measured and determined for each of the required system service(s), which S-KPIs have been selected and established to reflect the performance of the respective system service(s) in a relevant manner from a user perspective. The S-KPIs are measured by aggregating corresponding data collected in steps 302a-c.

Then, in a final step 306, the performance of the user service is evaluated based on the S-KPIs measured in step 304. For example, one or more threshold conditions may be defined for the measured S-KPIs which when fulfilled indicate whether the corresponding system service performance is deemed poor, medium, good, excellent, or similar, as relevant to the evaluated user service.

The skilled person will realise that various automatic functions may be implemented to combine measurement results for relevant S-KPIs to provide a status or the like of each system service being supervised. These results, and possibly also other data without limitation, can then be further aggregated in a suitable manner to evaluate the user service in total. For example, a customer support function or the like might be capable of translating a plurality of supervised systems services into any user service dependent on these systems services. It is also possible to aggregate the measurement and evaluation results to even higher levels, and the present invention is not limited in this respect.

The above steps 302a-c and 304 can basically be performed on a more or less continuous basis over the service lifecycle, as the user service is consumed by various users, whereas step 306 can be performed whenever evaluation is desired or required, e.g. intermittently or continuously. The entire process of steps 300-306 may also be executed in a service testing and/or set-up phase before the user service is launched.

A service evaluation apparatus in accordance with yet another possible embodiment will now be described with reference to the block diagram of FIG. 4. In this schematic figure, the service evaluation apparatus 400 evaluates a particular user service and comprises an S-KPI measuring block 400a adapted to collect data from sensors/counters 402 of three basically different sources denoted "user data" 402a, "traffic data" 402b and "infrastructure data" 402c, respectively. These data sources thus correspond to those described above.

The measuring block 400a is further adapted to measure different S-KPIs selected for a plurality of system services 1, 2, 3 . . . required for executing the user service being evaluated, based on the collected data. As shown in the figure, different types of S-KPIs can be measured from the collected data, including the above-described S-KPI types accessibility S-KPIs, retainability S-KPIs, and integrity S-KPIs.

The service evaluation apparatus 400 further comprises a service evaluating block 400b adapted to evaluate or estimate the performance of the user service based on the measured S-KPIs. In this example, the measurement results are conveyed from measuring block 400a to evaluating block 400b in the form of a service performance index SPI for each system service: SPI-1 for a first system service 1, SPI-2 for a second system service 2, SPI-3 for a third system service 3, and so forth. However, the measurement results can be conveyed and presented to the evaluating block 400b in any suitable manner, and the present invention is not limited in this respect.

Figure 4:
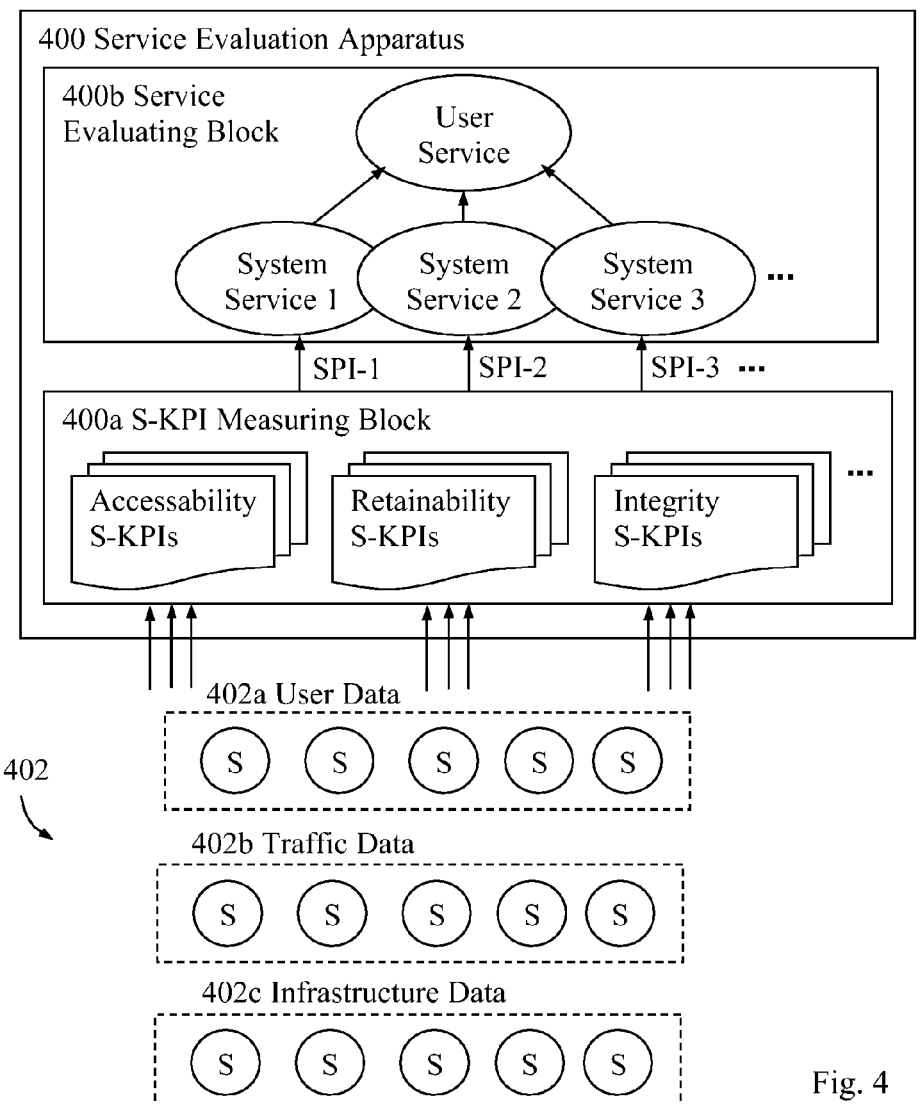
FIG. 4 is a block diagram illustrating a service evaluation apparatus, in accordance with yet another embodiment.

It should be noted that FIG. 4 merely illustrates the functional blocks 400a,b in a logical sense, while the skilled person is free to implement these functions in practice using any suitable software and hardware means. Thus, the present invention is generally not limited to the shown structure of the service evaluation apparatus 400. The apparatus 400 may be implemented in a service monitoring centre or the like and may further serve as a system service assurance architecture for performance monitoring.

A practical example of how a service performance index SPI can be configured for a particular system service is shown in FIG. 5. The SPI 500 suggests that ten relevant S-KPIs are selected and established for the system service. Even though the present invention is not generally limited to selecting any specific number of S-KPIs, it is preferable to carefully select a relatively small number of S-KPIs in order to obtain an accurate and reliable evaluation. The selection of suitable S-KPIs is preferably based on the ETSI standard.

In the example shown in FIG. 5, the SPI 500 contains certain columns denoted A-F. Column A contains names of the S-KPIs selected for the system service, and column B contains their current measured values. Here, the S-KPIs are named "1-10" for simplicity. The values in the SPI will vary depending on network configuration, traffic pattern, etc. Moreover, the measured S-KPI values may fluctuate in real time if updated on a continuous basis as data is constantly being collected from sensors and counters throughout the system. As mentioned above, these values can also be visualised as meters or the like pointing at different coloured fields to indicate a value status, e.g. accepted, not accepted and warning.

The next column C contains a theoretical value for each S-KPI that can be expected in a certain defined environment, e.g. with ample signal strength and transport capacity, etc. The next column D contains an acceptance value for each S-KPI which is derived from user/consumer studies and general market knowledge. The next column E contains a threshold value for each S-KPI in the real network currently used, which can be compared with the measured value, e.g. in order to generate alarms and generally support the evaluation. Finally, the last column F contains an allowed "delta" value for each S-KPI, i.e. a deviation +/− from a committed value, e.g. according to a previous agreement such as SLA or certain subscriber categories such as "silver", "gold" and "platinum". The values in both columns E and F may thus be related to SLA agreements or the like. The values in the SPI 500 can thus be used to support development of system and user services.

When the SPI is established, e.g. as shown in FIG. 5, information from various supporting tools may be used, without departing from the invention. Preferably, it should also be defined and described under which prerequisites the measured S-KPI values are deemed to be valid.

As described above, the present invention can be used to determine a measurable quality level QoSS related to specific well-defined system services, which in turn can be used to estimate a quality level QoUS related to a user service requiring these system services.

When selecting S-KPIs per system service, the information indicated below may also be determined.

<Service name>
<KPI descriptive name>
<Service specific additional info>
<Quantity> ( s, %, m...)
<Abstract definition or formula>

By implementing the present invention, user services can be evaluated in a more consistent, comparable, reliable and cost-efficient way, based on technically measurable parameters and characteristics, as relevant to the user's experience when consuming a user service. The system services can also be standardised which further promotes consistent evaluation of the users services. Furthermore, the present invention can be used to provide a new service assurance concept for user services and system services, such as the above-mentioned QoSS and QoUS.

In order to come as close as possible to the user's perception of a particular monitored user service, considerable efforts should be made when defining, selecting and/or establishing the S-KPIs for those system services required for executing the user service. Service providers and network operators can thus agree on a set of S-KPIs for each system service, to enable consistent evaluation. At the same time, the concept above can provide a clear baseline for, e.g., SLAs, OSS (Operation and Support System) and Telecom Management. The above-mentioned patent documents US 2005/0097209 A1 and WO 2005/032186 A1 make no distinction between system services and user services and can therefore not provide the benefits of the present invention outlined in this description.

To be able to assure a user service performance level in a specific timeframe, the S-KPIs for a specific system service are preferably documented in an SPI. The S-KPI values in SPI may be measured and monitored in a specified environment and time frame. The SPI may also specify possible monitoring and measurement tools, which is however outside the scope of the present invention.

The main users of such service performance information in an operator's organisation typically include customer support, service and network centres, and marketing and service managers. Suitable service performance reports, e.g. reflecting real-time performance, trends and SLA views, may be generated from the S-KPI measurements and SPIs of the involved system services.

Using the SPI, the Quality of System Service QoSS level can be determined and documented in a way that can be used also for assessing SLA agreements, service monitoring, Telecom Management and O&M (Operation & Maintenance) purposes. Furthermore, the documented and measurable QoSS level also paves the way for the QoUS.

The knowledge gained from S-KPIs relevant for user services enables fast service launch and can give operators a vital edge in the competitive global market when offering the user services. The opportunity to improve end-user perceived service quality may thus result in faster and higher revenue per user service. The present invention may therefore provide a major advantage when negotiating service performance through SLAs with third-party content and service providers.

In many advanced markets, the effects of service performance quality on market share, traffic growth and time to revenue, are well known. As the present invention allows for improved supervision of the performance of user services, a service performance can be maintained that fulfils or even exceeds user expectations. Thereby, customers will be more satisfied and the costs for running a helpdesk can also be minimised.

While the invention has been described with reference to specific exemplary embodiments, the description is in general only intended to illustrate the inventive concept and should not be taken as limiting the scope of the invention. The present invention may be generally defined by the following claims.

The invention claimed is:

1. A method of evaluating or estimating the performance of a specific user service executed in a communication network, said user service relating to the actual content or result delivered to and perceived by users consuming said user service, comprising the following steps:
  identifying one or more user-independent system services required for executing said user service, each system service being technically provided by equipment and protocols used in the network and/or user terminals,
  measuring a limited set of technically measurable system service key performance indicators S-KPIs for each identified system service, the S-KPIs being selected and established to reflect the performance of the respective system service(s), wherein relevant data for measuring said S-KPIs is collected from sensors and counters from the following sources:
    a) infrastructure data, providing information on how the involved nodes handle the delivery of services,
    b) traffic data, containing information for each communication session when executing the user service for each user, as measured by at least one passive probe, and
    c) end user data, as measured by at least one active probe in the user equipment,
  evaluating or estimating the performance of said user service based on the measured S-KPIs; and
  wherein the SKPIs are measured by aggregating data collected from sensors and counters installed in the communication path, when the respective system services are executed.

2. The method according to claim 1, wherein said limited set of S-KPIs includes a maximum of 10 selected S-KPIs for each system service.

3. The method according to claim 1, wherein the S-KPIs are selected and established to reflect at least one of the following areas:
  the rate of setting up said user service successfully,
  the rate of keeping said user service up and running successfully, and
  the rate of achieving a good or at least acceptable quality successfully for said user service.

4. The method according to claim 1, wherein the SKPIs are measured and monitored on a continuous basis.

5. The method according to claim 1, wherein the measured S-KPIs are provided for each system service in a Service Performance Index SPI containing current values of the SKPIs.

6. An apparatus for evaluating or estimating the performance of a specific user service executed in a communication network, said user service relating to the actual content or result delivered to and perceived by users consuming said user service comprising:
  an S-KPI measuring block for measuring a limited set of system service key performance indicators S-KPIs for each of one or more user-independent system services which are identified as being required for executing said user service, each system service being technically provided by equipment and protocols used in the network and/or user terminals, the S-KPIs being selected and established to reflect the performance of the respective system service(s), and to collect relevant data from sensors and counters for measuring said S-KPIs from the following sources:
    a) infrastructure data, providing information on how the involved nodes handle the delivery of services,
    b) traffic data, containing information for each communication session when executing the user service for each user, as measured by at least one passive probe, and
    c) end user data, as measured by at least one active probe in the user equipment,
  a service evaluating block for evaluating or estimating the performance of said user service based on the measured S-KPIs; and wherein the S-KPI measuring block measures the S-KPIs by aggregating data collected from sensors and counters installed in the communication path, when the respective system services are executed.

7. The apparatus according to claim 6, wherein said limited set of S-KPIs includes a maximum of selected S-KPIs for each system service.

8. The apparatus according to claim 6, wherein the selected and established S-KPIs reflect at least one of the following areas:
   the rate of setting up said user service successfully,
   the rate of keeping said user service up and running successfully, and
   the rate of achieving a good or at least acceptable quality successfully for said user service.

9. The apparatus according to claim 6, wherein the S-KPI measuring block measures the S-KPIs on a continuous basis.

10. The apparatus according to claim 6, wherein the S-KPI measuring block provides the measured S-KPIs for each system service in a Service Performance Index SPI containing current values of the S-KPIs.

11. The apparatus according to claim 6, wherein said apparatus serves as a system service assurance architecture for performance monitoring.

* * * * *